US009473561B2

(12) United States Patent
Cameron et al.

(10) Patent No.: US 9,473,561 B2
(45) Date of Patent: *Oct. 18, 2016

(54) DATA TRANSMISSION FOR TRANSACTION PROCESSING IN A NETWORKED ENVIRONMENT

(71) Applicant: International Business Machines Corporation, Armonk, NY (US)

(72) Inventors: David A. Cameron, Ontario (CA); Shyh-Mei F. Ho, Cupertino, CA (US); Jenny C. Hung, San Jose, CA (US); Jack C. Yuan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 601 days.

This patent is subject to a terminal disclaimer.

(21) Appl. No.: 13/841,665

(22) Filed: Mar. 15, 2013

(65) Prior Publication Data

US 2014/0280759 A1    Sep. 18, 2014

(51) Int. Cl.
| | |
|---|---|
| *G06F 15/16* | (2006.01) |
| *G06F 17/00* | (2006.01) |
| *H04L 29/08* | (2006.01) |
| *G06F 9/46* | (2006.01) |
| *G06F 17/30* | (2006.01) |

(52) U.S. Cl.
CPC .............. *H04L 67/10* (2013.01); *G06F 9/466* (2013.01); *G06F 17/30227* (2013.01); *H04L 67/06* (2013.01); *H04L 67/1097* (2013.01); *G06F 17/30244* (2013.01); *G06F 17/30371* (2013.01)

(58) Field of Classification Search
CPC .. G06F 9/466; G06F 9/467; G06F 17/30227; G06F 17/30244; G06F 17/30265; G06F 17/30283; G06F 17/30345–17/30383; H04L 28/08549; H04L 67/1097; H04L 29/08702
See application file for complete search history.

(56) References Cited

U.S. PATENT DOCUMENTS

| | | | | |
|---|---|---|---|---|
| 5,182,709 | A * | 1/1993 | Makus | G06F 17/215 |
| | | | | 400/109 |
| 6,484,185 | B1 * | 11/2002 | Jain | G06F 9/466 |
| 6,615,219 | B1 * | 9/2003 | Bruso | G06F 17/30067 |
| | | | | 707/699 |
| 6,779,001 | B1 * | 8/2004 | Kanai | G06F 9/466 |
| 7,047,309 | B2 | 5/2006 | Baumann et al. | |

(Continued)

OTHER PUBLICATIONS

"String (Java Platform SE 7)," 2012. Was archived by archive.org on Jan. 6, 2012.*

(Continued)

*Primary Examiner* — Emmanuel L Moise
*Assistant Examiner* — Julian Chang
(74) *Attorney, Agent, or Firm* — Patterson + Sheridan, LLP

(57) ABSTRACT

Techniques are disclosed to transmit arbitrarily large data units for transaction processing in a networked environment. A request is received to store a data unit of a size exceeding an allocated memory address space of a transaction gateway component of the networked environment. A predefined store function, provided by a repository interface component, is invoked to store the data unit to a data repository component of the networked environment and without segmenting the data unit. A repository handle of the stored data unit is identified. A predefined load function, provided by the repository interface component, is invoked to load a portion of the stored data unit, based on the identified repository handle, where the portion is smaller than the stored data unit.

20 Claims, 9 Drawing Sheets

(56) References Cited

U.S. PATENT DOCUMENTS

| | | | | |
|---|---|---|---|---|
| 7,447,775 | B1* | 11/2008 | Zhu | H04N 21/23439 709/217 |
| 7,486,659 | B1* | 2/2009 | Unbehagen | H04L 12/4633 370/351 |
| 7,558,862 | B1* | 7/2009 | Tyukasz | H04L 63/029 709/227 |
| 7,739,456 | B1* | 6/2010 | Cypher | G06F 9/3004 711/145 |
| 8,140,828 | B2* | 3/2012 | Shen | G06F 9/466 710/52 |
| 8,510,344 | B1* | 8/2013 | Briggs | G06F 17/30318 707/802 |
| 8,688,666 | B1* | 4/2014 | Briggs | G06F 17/30318 707/705 |
| 8,856,089 | B1* | 10/2014 | Briggs | G06F 17/30351 707/695 |
| 9,021,130 | B1* | 4/2015 | Sahay | H04L 12/28 370/351 |
| 2003/0079032 | A1* | 4/2003 | Orsolits | H04L 12/2602 709/230 |
| 2004/0186894 | A1 | 9/2004 | Jhingan et al. | |
| 2004/0230719 | A1* | 11/2004 | Wu | H04L 67/1097 710/33 |
| 2004/0260745 | A1* | 12/2004 | Gage | H04L 29/12009 709/200 |
| 2005/0024510 | A1* | 2/2005 | Lapstun | H04N 5/378 348/294 |
| 2005/0050135 | A1* | 3/2005 | Hallermeier | G06F 3/0605 709/200 |
| 2005/0097185 | A1* | 5/2005 | Gibson | H04L 29/06 709/217 |
| 2006/0064405 | A1* | 3/2006 | Jiang | H04L 67/1097 |
| 2006/0167922 | A1* | 7/2006 | Poyourow | G06F 17/30318 |
| 2007/0288934 | A1 | 12/2007 | Khan et al. | |
| 2007/0299816 | A1* | 12/2007 | Arora | G06F 17/30318 |
| 2008/0005383 | A1* | 1/2008 | Bender | G06F 13/28 710/22 |
| 2009/0024578 | A1* | 1/2009 | Wang | G06F 17/30421 |
| 2009/0150641 | A1* | 6/2009 | Flynn | G06F 3/061 711/202 |
| 2010/0049718 | A1* | 2/2010 | Aronovich | G06F 17/30115 707/607 |
| 2010/0106695 | A1* | 4/2010 | Calder | G06F 17/30501 707/696 |
| 2010/0115535 | A1* | 5/2010 | Kamii | G06F 3/0607 719/327 |
| 2010/0138571 | A1* | 6/2010 | Cain, III | G06F 9/467 710/56 |
| 2010/0223539 | A1* | 9/2010 | Nowoczynski | G06F 3/067 714/807 |
| 2010/0281224 | A1* | 11/2010 | Ho | G06F 17/30902 711/137 |
| 2010/0332401 | A1* | 12/2010 | Prahlad | G06F 17/3002 705/80 |
| 2011/0041006 | A1* | 2/2011 | Fowler | G06F 9/466 714/10 |
| 2011/0137962 | A1* | 6/2011 | McKenney | G06F 17/30371 707/818 |
| 2011/0145637 | A1* | 6/2011 | Gray | G06F 11/141 714/15 |
| 2011/0202743 | A1* | 8/2011 | Kaneda | G06F 12/0284 711/170 |
| 2011/0246725 | A1* | 10/2011 | Moir | G06F 9/467 711/147 |
| 2011/0246993 | A1* | 10/2011 | Moir | G06F 9/467 718/101 |
| 2011/0264817 | A1* | 10/2011 | Raveendran | H04M 3/5307 709/230 |
| 2012/0011178 | A1* | 1/2012 | Pfeifle | G06F 17/30318 707/825 |
| 2012/0039469 | A1* | 2/2012 | Mueller | G06Q 20/12 380/252 |
| 2012/0047365 | A1* | 2/2012 | Mercer | G06F 21/606 713/168 |
| 2012/0079246 | A1* | 3/2012 | Breternitz, Jr. | G06F 9/30072 712/208 |
| 2012/0221767 | A1* | 8/2012 | Post | G06F 13/1673 711/103 |
| 2012/0303877 | A1* | 11/2012 | Benhase | G06F 12/123 711/103 |
| 2012/0311273 | A1* | 12/2012 | Marathe | G06F 9/467 711/151 |
| 2013/0160022 | A1* | 6/2013 | Blight | G06F 9/466 718/104 |
| 2013/0232190 | A1* | 9/2013 | Miller | H04L 67/42 709/203 |
| 2014/0122523 | A1* | 5/2014 | Aggarwal | G06F 17/30525 707/769 |
| 2014/0164574 | A1* | 6/2014 | Gao | H04L 67/06 709/219 |
| 2014/0280680 | A1 | 9/2014 | Cameron et al. | |
| 2014/0379996 | A1* | 12/2014 | Rajwar | G06F 9/3004 711/145 |

OTHER PUBLICATIONS

IBM, System and method to handle large attachments in a meditation flow, IP.com: Prior Art Database, Apr. 14, 2009, Fairport, United States.

OpenText: Managed File Transfer: express [enterprise] file delivery, 2011, Agility Compliance Productivity, Ontario, Canada.

OpenText: Managed File Transfer: Technical Overview, OpenText: The Content Experts, v1.2, Agility Compliance Productivity, Ontario, Canada.

IBM, Process for generating and initiating throttleable large streams of transactions for IMS TM systems testing, IP.com: Prior Art Database, Nov. 10, 2009, Fairport, United States.

OpenText: Managed File Transfer express [enterprise] file delivery, 2008, Agility Compliance Productivity, Ontario, Canada, 14 pages.

OpenText: Managed File Transfer: Technical Overview, OpenText: The Content Experts, v1.2, 2008, Agility Compliance Productivity, Ontario, Canada, 3 pages.

* cited by examiner

DATA TRANSMISSION FOR TRANSACTION PROCESSING IN A NETWORKED ENVIRONMENT

BACKGROUND

1. Field of the Invention

Embodiments disclosed herein relate to data transmission. More specifically, embodiments disclosed herein relate to data transmission for transaction processing in a networked environment.

2. Description of the Related Art

In computing, transaction processing is a type of information handling in which operations are divided into individual, indivisible, units of work called transactions. Each transaction must succeed or fail as a complete unit and cannot remain in an intermediate state. Transaction processing is designed to maintain a computer system, such as a database, in a consistent state, which is characterized by a notion that any interdependent operations in the system either all complete successfully or all cancel successfully. For example, a typical banking transaction that involves moving money from a customer savings account to a customer bank account is a single transaction to the bank, even though at least two separate operations are involved from a computing perspective. These operations include debiting of the savings account and crediting of the bank account. From this example, the operations in the transaction must either both succeed or both fail, to prevent an inconsistency in the bank database. Transaction processing allows multiple individual operations to be linked together automatically as a single, indivisible transaction. The transaction processing system ensures that either all operations in a transaction are completed without error, or that none of them are completed. If some of the operations are completed but errors occur when the others are attempted, the transaction processing system rolls back all of the operations of the transaction, including the successful ones, thereby erasing all traces of the transaction and restoring the system to a previous, consistent state. If all operations of a transaction are completed successfully, the transaction is committed by the system, and all changes to the database are made permanent.

SUMMARY

Embodiments presented in this disclosure provide a computer-implemented method to transmit arbitrarily large data units for transaction processing in a networked environment. The computer-implemented method includes receiving a first request to store a first data unit of a size exceeding an allocated memory address space of a transaction gateway component of the networked environment. The computer-implemented method also includes invoking a first predefined store function provided by a repository interface component, to store the first data unit to a data repository component of the networked environment and without segmenting the first data unit. The computer-implemented method also includes identifying a repository handle of the stored data unit. The computer-implemented method also includes invoking a first predefined load function provided by the repository interface component, to load a portion of the stored data unit, based on the identified repository handle, where the portion is smaller than the stored data unit.

Other embodiments presented in this disclosure provide a computer program product to transmit arbitrarily large data units for transaction processing in a networked environment. The computer program product includes a computer-readable storage medium having program code embodied therewith. The program code is executable by one or more computer processors to receive a first request to store a first data unit of a size exceeding an allocated memory address space of a transaction gateway component of the networked environment. The program code is also executable to invoke a first predefined store function provided by a repository interface component, to store the first data unit to a data repository component of the networked environment and without segmenting the first data unit. The program code is also executable to invoke a first predefined load function provided by the repository interface component, to load a portion of the stored data unit, based on the identified repository handle, where the portion is smaller than the stored data unit.

Still other embodiments presented in this disclosure provide a system to transmit arbitrarily large data units for transaction processing in a networked environment. The system includes one or more computer processors and a memory containing a program which, when executed by the one or more computer processors, is configured to perform an operation that includes receiving a first request to store a first data unit of a size exceeding an allocated memory address space of a transaction gateway component of the networked environment. The operation also includes invoking a first predefined store function provided by a repository interface component, to store the first data unit to a data repository component of the networked environment and without segmenting the first data unit. The operation also includes identifying a repository handle of the stored data unit. The operation also includes invoking a first predefined load function provided by the repository interface component, to load a portion of the stored data unit, based on the identified repository handle, where the portion is smaller than the stored data unit.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
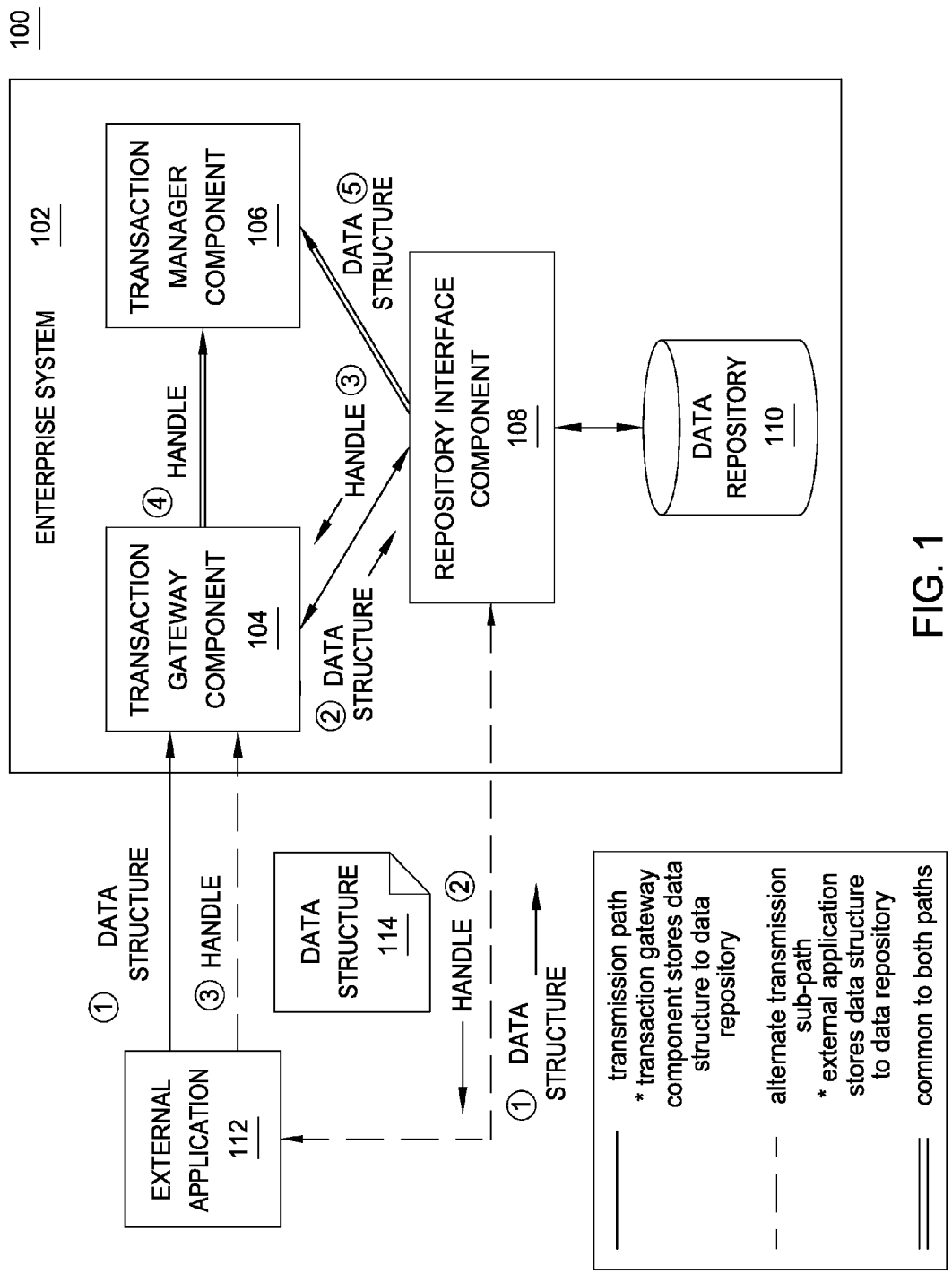
FIG. 1 is a data flow diagram illustrating components of a networked system configured to process transactions involving arbitrarily large data units, according to one embodiment presented in this disclosure.

Embodiments presented in this disclosure provide techniques to manage arbitrarily large data in transaction processing in a networked environment. Depending on the embodiment, the arbitrarily large data may be in the form of a data unit, which refers to any unit of data that may be transmitted according to the techniques disclosed herein. A data unit is also referred to herein as a data structure. Depending on the embodiment, the data unit may contain a request itself or only the data accompanying a request. The data unit may include structured data or unstructured data. Further, depending on the embodiment, different types of transactions may be supported by the networked environment. One example of the networked environment is an enterprise information system (EIS). In one embodiment, an EIS provides a technology platform that allows organizations to integrate and coordinate business processes thereof. In some embodiments, an EIS provides a unified system that is central to a given organization and that facilitates sharing of information across different functional levels and management hierarchies of the given organization. At least in some embodiments, an EIS standardizes data for an organization, thereby reducing an extent of information fragmentation resulting from having multiple information systems within the organization. Further, an EIS may support provider-type transactions, where a distributed application (e.g., a distributed client) sends a request to the EIS and optionally receives a response from the EIS. Additionally or alternatively, an EIS may support consumer-type transactions, where the EIS acts as a client that sends out a request to a distributed application (e.g., a distributed server) and optionally receives a response from the distributed application.

In some cases, there may also be usage constraints associated with a given EIS. The usage constraints may relate to processing provider-type and consumer-type transactions involving data structures of a size beyond a predefined threshold size. Examples of data structures include messages, file attachments, etc. Data structures beyond the predefined threshold size—such as X-ray data, magnetic resonance imaging (MRI) data, medical records, fingerprint data, pictures in support of insurance claims, video data, etc., which may often even number in the zettabytes (ZB)—may be too costly to transfer from distributed applications to the EIS and vice versa via predetermined communication protocols, examples of which include Transmission Control Protocol/Internet Protocol (TCP/IP), IBM Cross System Coupling Facility (XCF), etc. For instance, a given EIS may not necessarily support transaction processing for requests involving arbitrarily large data structures, also referred to herein as "large data". Further, a given EIS may not necessarily support transaction processing involving arbitrarily large data structures for requests not pertaining to web services. Further still, a given EIS may not necessarily provide any mechanism to retrieve merely a portion of the data structure for processing, rather than the entire data structure.

By configuring a networked environment, such as an EIS, using the techniques disclosed herein, the networked environment may support transaction processing for requests involving arbitrarily large data structures. In some embodiments, the networked environment is configured to include an application programming interface (API) providing predefined load and store functions for transferring arbitrarily large data structures to and from a data repository, also referred to herein as a repository. Doing so allows the networked environment to process transactions using repository handles to the data structures stored in the data repository, where the repository handles may be forwarded among components within the networked environment, thereby eliminating any need to forward the actual data structures within the networked environment.

In some embodiments, the API further provides a second load function configured to load only a specified portion of a desired data structure stored in the data repository. The second load function may also be referred to herein as a predefined scan function. Loading only a specified portion of a desired data structure may ease memory constraints associated with transaction processing at least in some cases. Additionally or alternatively, the API may provide a function configured to append data to a specified data structure stored in the data repository, e.g., to support video streaming. The function is also referred to herein as a predefined append function. The API may also provide functions to clean up or remove a specified data structure from the data repository upon loading the specified data structure or via explicit calls to a predefined cleanup function, also referred to herein as a destroy function. Such an API allows the networked environment to better support data integrity at least in some cases.

At least in some embodiments, configuring a networked environment using the techniques disclosed herein may reduce network traffic by avoiding having to pass arbitrarily large data structures as a request or response is transmitted within the networked environment and via predetermined communication protocols. Input/output (I/O) load may also be reduced at least in some cases, given that the data structures, once stored, are assigned repository handles that may then be forwarded within the networked environment, where the repository handles are also referred to herein as handles. For instance, the handles may be forwarded as part of control data associated with a request or a response. Further, message queue processing may be reduced for provider-type transactions at least in some cases.

At least in some embodiments, predefined memory constraints for consumer-type transactions may be overcome at least in some cases. One example of a predefined memory constraint is a two gigabyte (2 GB) memory constraint for consumer-type transactions for a given EIS. Further, I/O load may be further reduced in some cases, due to portions of data structures being loaded only as needed. Further still, the ability to consolidate data via the append function allows transactions to be processed more conveniently or efficiently at least in some cases. Depending on the embodiment, other constraints may also be overcome, such as Common Business-Oriented Language (COBOL) and Programming Language One (PL/I) compiler size constraints for EIS transactional applications, or 31-bit memory constraints of a given EIS.

In some cases, provider-type transaction processing in a networked environment may require segmentation and message queue processing. In one embodiment, segmentation and message queue processing involves dividing an arbitrarily large data structure into smaller segments of predefined size, such as thirty-two kilobytes (32 KB), and subsequently assembling multiple smaller segments together to form a response to a request. On the other hand, by configuring a networked environment using the techniques disclosed herein, the networked environment may support provider-type transaction processing without segmentation and without message queue processing at least in some cases.

Further, in some cases, consumer-type transaction processing in a networked environment may require storing a message in a predefined memory area within the networked environment, also referred to herein as control region memory. In one embodiment, the control region memory refers to an allocated memory address space of a transaction gateway component of the networked environment. The control region memory may often have an associated size constraint pertaining to messages and data structures, e.g., a constraint of two gigabytes (2 GB) per address space, where a message refers to a request or a response. Hence, an arbitrarily large data structure exceeding the size constraint may require processing multiple requests and responses and further require the EIS and the distributed application to include predefined logic configured to generate or manage the multiple requests and responses. On the other hand, by configuring a networked environment using the techniques disclosed herein, the size constraint of control region memory may be overcome at least in some cases, and the processing of multiple requests and responses may be avoided or simplified at least in some cases. In other embodiments, even arbitrarily large data structures not exceeding the size constraint may be processed using the techniques disclosed herein to improve efficiency of transaction processing at least in some cases.

At least in some embodiments, such networked environments may also better provide, to external applications, an abstraction creating an appearance that data units are not segmented within the networked environment—regardless of whether the data units are actually segmented within the networked environment. Any segmenting of the data units is nevertheless performed in a manner transparent to the external applications. Accordingly, from the perspective of the external applications, the data units remain intact within the networked environment, regardless of the size of the data units.

FIG. 1 is a data flow diagram 100 illustrating components of a networked system configured to process transactions involving arbitrarily large data structures, according to one embodiment presented in this disclosure. As shown, the networked system is an enterprise system 102, of which an example is an EIS. The enterprise system 102 includes a transaction gateway component 104, a transaction manager component 106, a repository interface component 108, and a repository 110. As described above, different types of transactions may be supported by the enterprise system 102. For example, the enterprise system 102 may support provider-type transactions, in which an external application 112, such as a distributed client, sends a request, involving a data structure 114 of an arbitrarily large size, to the enterprise system 102 and optionally receives a response from the enterprise system 102. Additionally or alternatively, the enterprise system 102 may support consumer-type transactions, in which the enterprise system 102 acts as a client in sending out a request to the external application 112, such as a distributed server, and in optionally receiving a response from the external application 112.

In one embodiment, the API to load or store the data structure 114 to or from the data repository 110 may be provided by the repository interface component 108. As described above, the API may provide various functions, such as a function to load only a portion of the stored data structure 114. The repository interface component 108 also provides a handle for the data structure 114 to the transaction gateway component 104 or to the transaction manager component 106. Accordingly, the enterprise system 102 may more efficiently process transactions involving arbitrarily large data structures at least in some cases. Further, in some alternative embodiments, the external application 112 directly accesses the API provided by the repository interface component 108. In such embodiments, the external application 112 may load and store arbitrarily large data structures via the API and send and receive requests with handles to and from the transaction gateway component 104.

In one embodiment, the transaction manager component is a message-based transaction processor. In that case, a transaction may include a message specifying a set of input data that triggers the execution of a desired application. The transaction may also include any results returned from executing the desired application. In one embodiment, the transaction manager component may process input messages received from a variety of sources, such as a terminal network, other transaction managers, and the Web. The transaction manager component may also process output messages created by application programs. Further, the transaction manager component may provide an underlying queuing mechanism for handling these messages. Further still, the transaction manager component may at least in some cases provide high-volume, high-performance, high-capacity, low-cost transaction processing for various types of data sources, such as hierarchical databases, relational databases, etc. In some embodiments, the transaction manager is configured to interact with an end-user or another application, process a desired business function such as a bank account withdrawal, and maintain state throughout, such that the system properly records the business function to storage, such as a database. The end-user may be connected via Virtual Telecommunications Access Method (VTAM), TCP/TP, terminals such as IBM 3270, web interfaces, etc. At least in some embodiments, transaction processing is performed to maintain database integrity in a consistent state and by enforcing atomicity of transactions.

Figure 2:
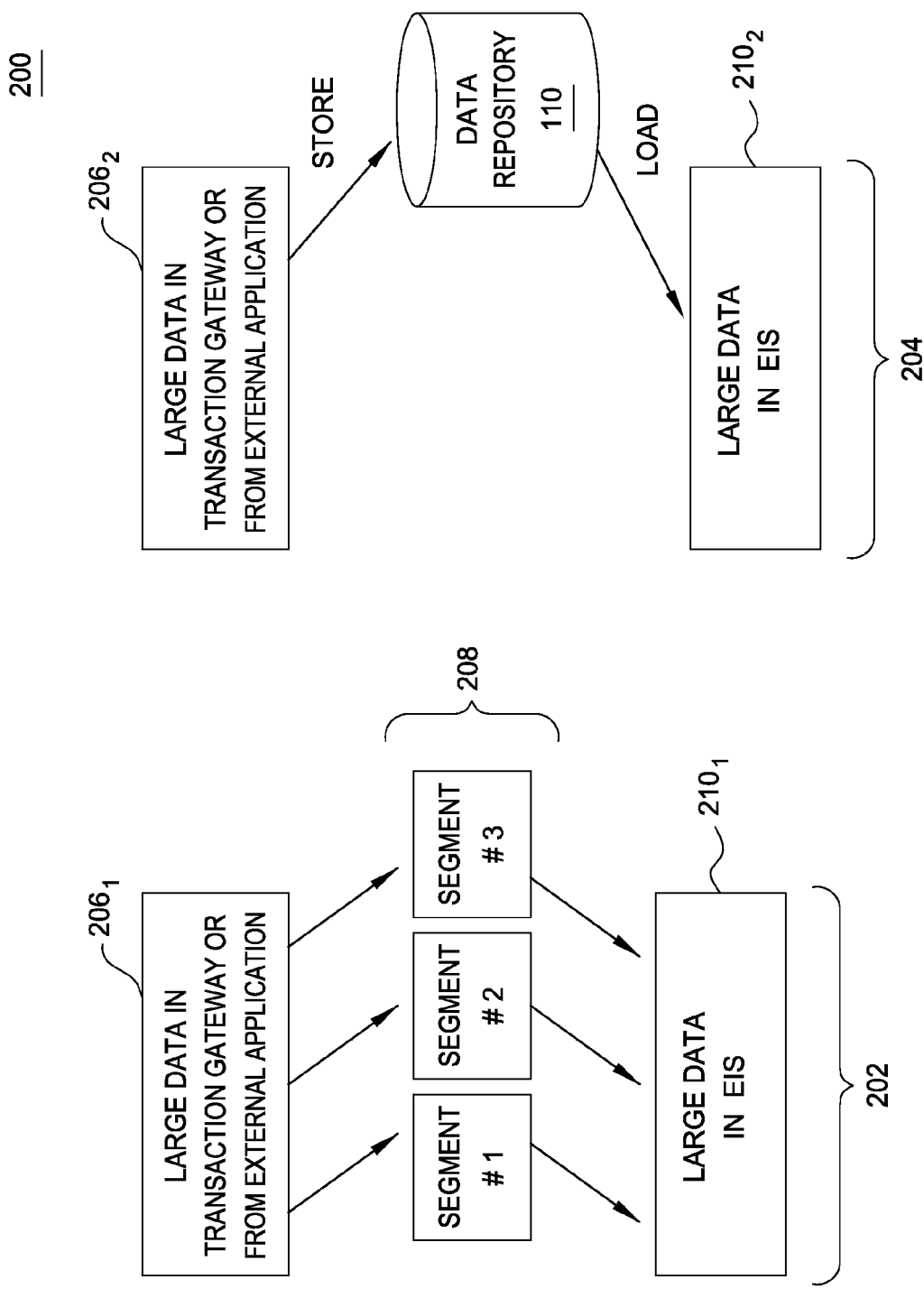
FIG. 2 is a data flow diagram illustrating different approaches to processing transactions involving arbitrarily large data units in a networked environment, according to one embodiment presented in this disclosure.

FIG. 2 is a data flow diagram 200 illustrating different approaches to processing transactions involving arbitrarily large data structures in a networked environment, according to one embodiment presented in this disclosure. As shown, the data flow diagram 200 includes a first approach 202 involving segmentation and a second approach 204 not involving segmentation. In the first approach 202, the transaction gateway component 104 divides an arbitrarily large data structure—such as the data structure 114 of FIG. 1—into multiple segments 208 of up to a threshold segment size. The multiple segments 208 are subsequently assembled in the networked environment to form the arbitrarily large data structure. For instance, an incoming provider-type request, including a data structure, may be received by a predefined function associated with the EIS, such as integrated TCP/IP gateway for the EIS. The data structure may be divided into segments of thirty-two kilobytes (32 KB) in size, before the data structure is sent from the predefined function to the EIS. When the EIS subsequently sends a response containing one or more of the segments 208, the segments are assembled to form part or all of the data structure, prior to sending the data structure from the EIS to predefined function.

In the second approach 204, the networked environment is configured with components and an API that allow the data structures to be processed separately from the rest of the networked environment. In one embodiment, the transaction gateway component 104 invokes a store function provided by the API, to store the arbitrarily large data structure into the data repository 110, where the data repository 110 supports loading and storing of data structures. An example of a transaction gateway component 104 is an enterprise gateway, which may refer to a gateway that is on the same systems complex (sysplex) as the transaction manager component. Examples of the enterprise gateway include TCP/IP gateways such as EIS transaction gateways and further include Hypertext Transfer Protocol (HTTP) gateways such as a Simple Object Access Protocol (SOAP) gateway for an EIS. Examples of the data repository 110 include virtual storage access method (VSAM) data sets, partitioned data set extended (PDSE) data sets, databases and associated database management system (DBMS), etc.

Once stored, the data structure under the second approach 204 may be passed via a handle, according to one embodiment. Accordingly, the transaction gateway component 104 obtains the handle of the stored data structure and passes the handle to other components of the networked environment as needed. The data structure may subsequently be loaded in the networked environment by invoking a load function provided by the API while passing the handle. If the response from the networked environment refers to a data structure, the data structure may first be stored, and subsequently loaded by the transaction gateway component 104 of the networked environment. In embodiments where the transaction gateway component 104 acts as a first entry point into the EIS, having the transaction gateway component 104 invoke load and store functions reduces network traffic within the EIS to a greater extent than having other components invoke the load and store functions.

At least in some embodiments, the specific functions provided by the API may be tailored to suit the needs of a particular case. Table I provides a description of functions provided by the API, according to one embodiment.

Table I—Example Functions Provided by the API and Associated Pseudocode
Storing an entire data structure in repository: handle store (pointer, size, properties)
Storing additional data to repository: handle append (pointer, size, handle, properties)
Loading an entire data structure from repository: bytes=loadFull (handle, properties)
Loading a portion of a data structure: bytes=loadWindow (handle, index, size, properties)
Function to destroy and clean up a data structure: status=destroy (handle, properties)
In Table I, "pointer" refers to a memory address to a desired data structure. "Size" refers to a desired size of data in bytes. "Properties" refers to repository access information, a browse/discard option, and a retrieval option. In some embodiments, the function to load an entire attachment provides an option to delete the data structure from the data repository upon loading the data structure. "Handle" refers to an object handle to a data structure stored in the data repository. "Window size" refers to a desired portion size of the data structure to load. "Bytes" is a variable containing the returned data. "Status" refers to information returned from invoking a function, such as success/failure information.

Figure 3:
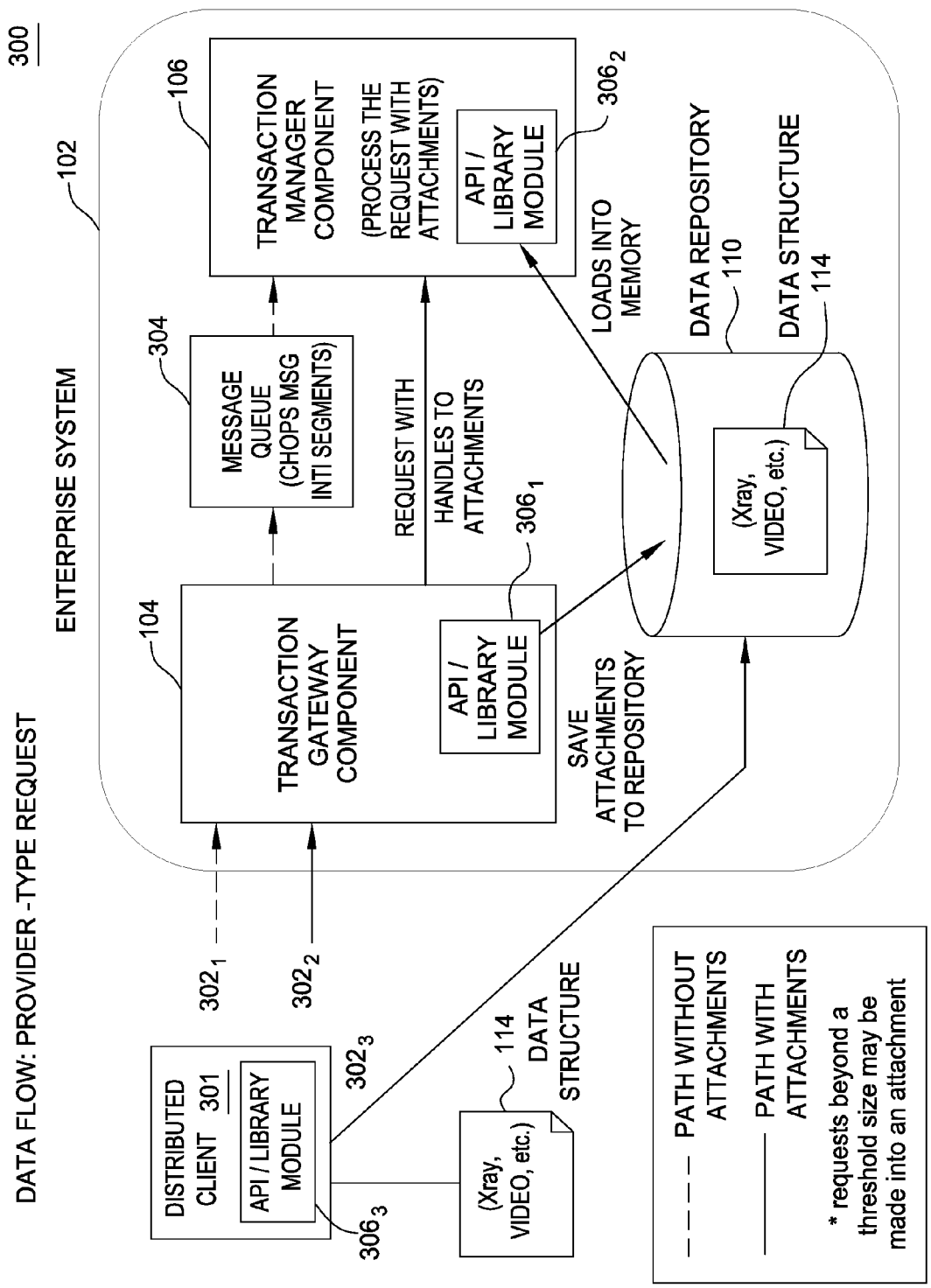
FIG. 3 is a data flow diagram of transaction processing for a provider-type request, according to one embodiment presented in this disclosure.

FIG. 3 is a data flow diagram 300 of transaction processing for a provider-type request, according to one embodiment presented in this disclosure. As shown, the enterprise system 102 includes the transaction gateway component 104, the transaction manager component 106, the data repository component 110, and a message queue 304. Further, the repository interface component 100 of FIG. 1 may be implemented as API/library modules $306_{1-2}$. In one embodiment, upon receiving, from a distributed client 301, a request $302_1$ that does not specify any data structure, the request $302_1$ is divided into segments by the message queue 304 and passed to the transaction manager component 106 for processing.

On the other hand, upon receiving, from the distributed client 301, a request $302_2$ that specifies the data structure 114, the transaction gateway component 104 invokes a store function via the API/library module $306_1$ to store the data structure 114 into the data repository 110. Depending on the embodiment, the store function is invoked for data structures of any size or, alternatively, only those data structures exceeding a specified minimum size. Further, the transaction gateway component 104 passes the request, including a handle associated with the stored data structure 114, to the transaction manager component 106, thereby bypassing the message queue 304. In some embodiments, the message queue 304 is bypassed only for the data structure 114 while the request $302_2$ itself is still divided into segments. Alternatively, the message queue 304 is bypassed for both the data structure 114 and the request $302_2$. The transaction manager component 106 then processes the request $302_2$, loading the data structure 114 from the data repository 110 into memory via the API/library module $306_2$ and by passing the handle.

At least in some embodiments, the distributed client 301 may directly access the API/library module $306_3$ to load, store, send, or receive arbitrarily large data structures to or from the transaction gateway component 104, as represented by the request $302_3$. Further still, depending on the embodiment, one or more of the API/library modules $306_{1-3}$ may be the same type or of different types. Still further, at least in some embodiments, any requests beyond a threshold size may itself may be made into and/or processed as a data structure according to the techniques disclosed herein. Because the message queue 304 is bypassed for requests specifying data structures, segmentation of the data structures is avoided, thus improving transaction processing performance in some cases.

Figure 4:
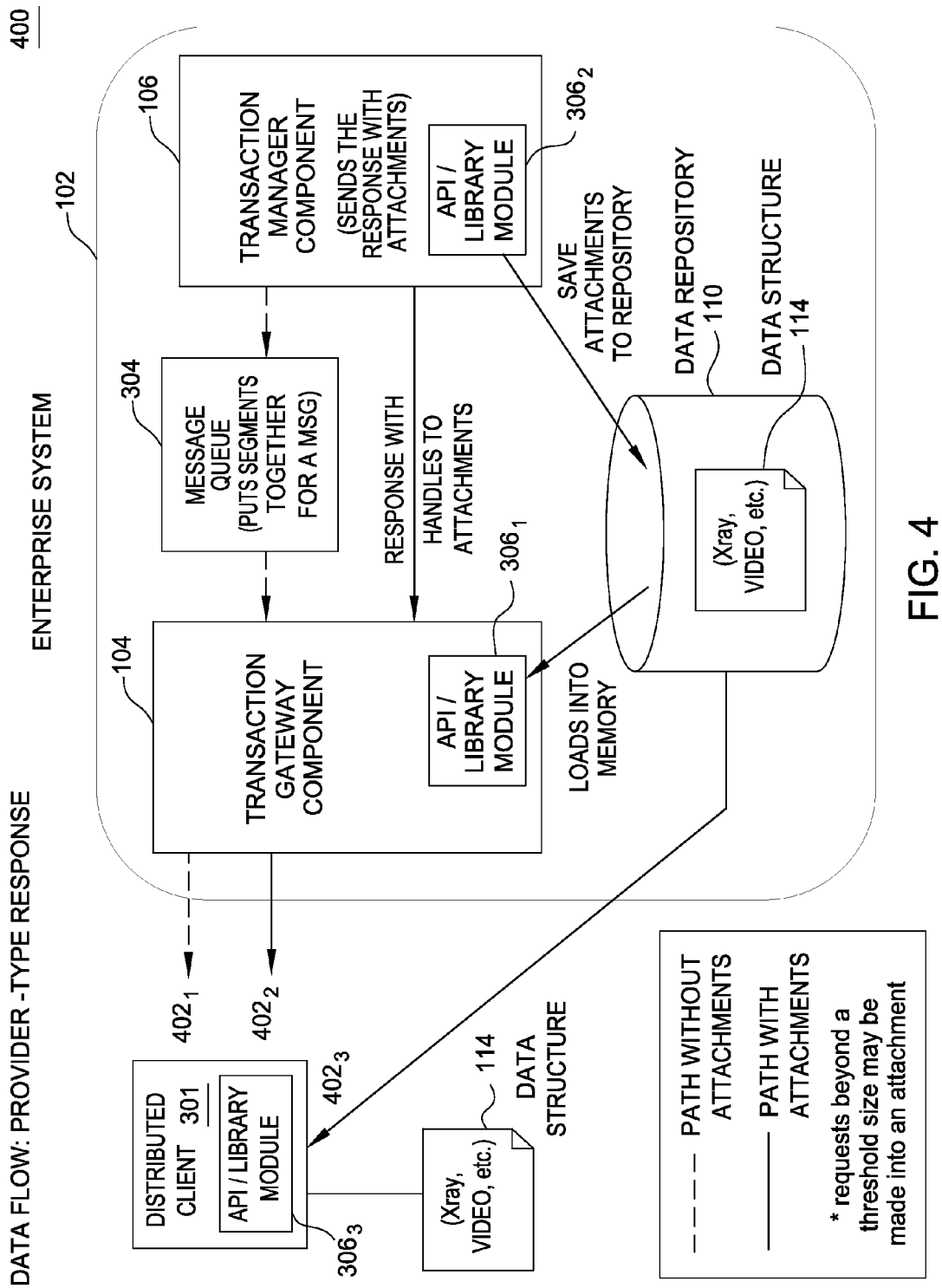
FIG. 4 is a data flow diagram of transaction processing for a provider-type response, according to one embodiment presented in this disclosure.

FIG. 4 is a data flow diagram 400 of transaction processing for a provider-type response, according to one embodiment presented in this disclosure. In one embodiment, when the enterprise system 102 responds to the distributed client 301 without data structures—or with data structures not exceeding the specified minimum size—multiple segments from the transaction manager component 106 are received by the message queue 304, assembled into the response $402_1$, and passed to the transaction gateway component 104. The transaction gateway component 104 then sends the assembled response to the distributed client 301.

On the other hand, when the enterprise system 102 responds to the distributed client 301 with a data structure—or with a data structure exceeding the specified minimum size—then the transaction manager component 106 saves the data structure 114 into the data repository 110 by invoking a predefined store function provided by the API/library module $306_2$. The transaction manager component 106 then sends a handle obtained from the data repository 110 and pertaining to the stored data structure 114, to the transaction gateway component 104. The transaction gateway component 104 may then invoke a predefined load function provided by the API/library module $306_1$, to load the data structure 114 into memory. The transaction gateway component 104 may then send, to the distributed client 301, a response $402_2$ with the loaded data structure 114. Further, at least in some embodiments, the distributed client 301 may directly access the API/library module $306_3$ to load, store, send, or receive arbitrarily large data structures to or from the transaction gateway component 104, as represented by the response $402_3$. Because the message queue 304 is bypassed for responses specifying data structures, segmentation of the data structures is avoided, thus improving transaction processing performance in some cases.

Figure 5:
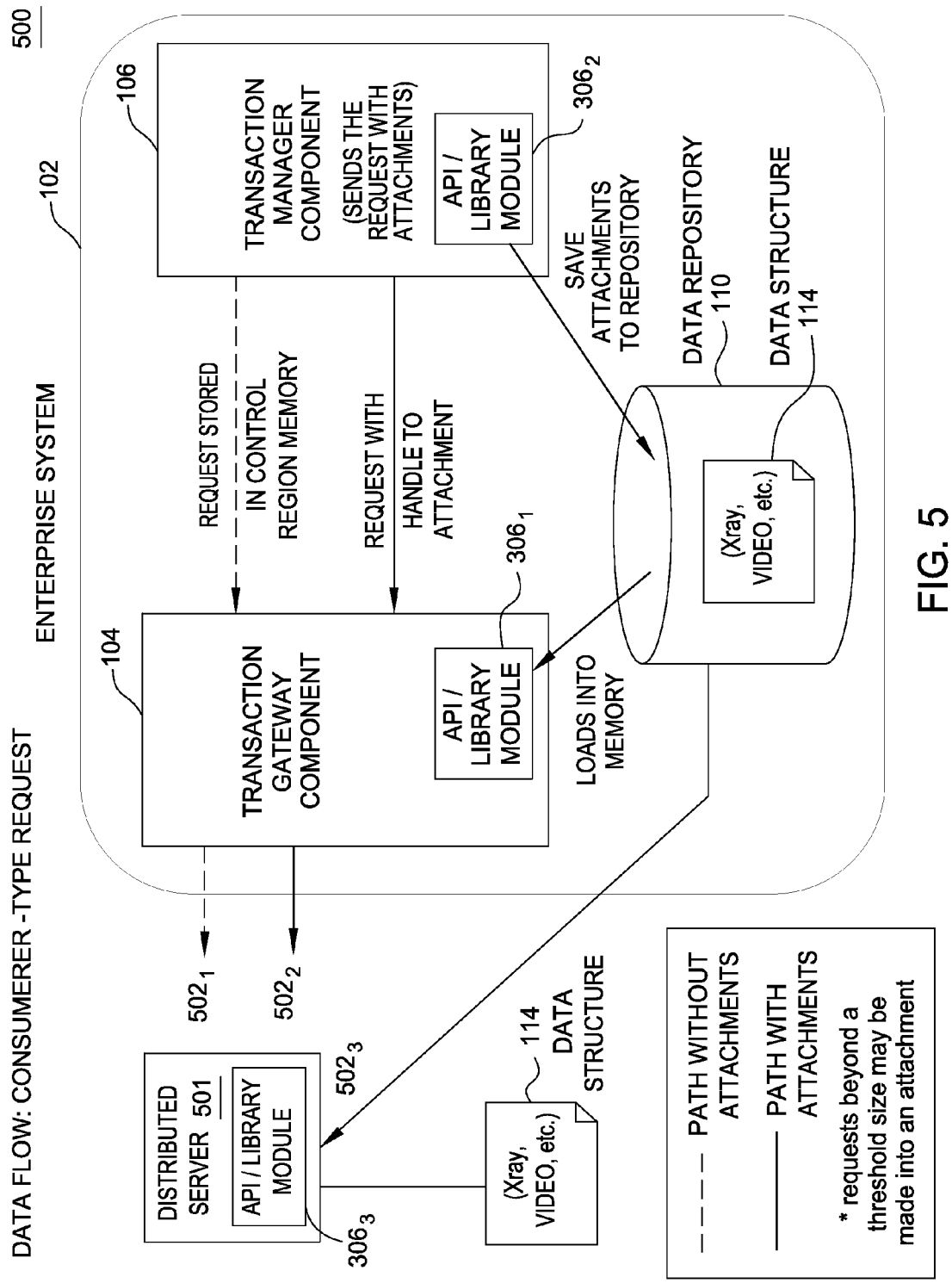
FIG. 5 is a data flow diagram of transaction processing for a consumer-type request, according to one embodiment presented in this disclosure.

FIG. 5 is a data flow diagram 500 of transaction processing for a consumer-type request, according to one embodiment presented in this disclosure. In one embodiment, the transaction gateway component 104 may include an allocated memory address space referred to as control region memory and having an associated size constraint, e.g., two gigabytes (2 GB). When the enterprise system 102 sends, to a distributed server 501, a request $502_1$ without data structures, the request $502_1$ is first sent to the transaction gateway component 104, where the request $502_1$ is stored in control region memory. The transaction gateway component 104 then sends the request $502_1$ to the distributed server 501.

On the other hand, when the enterprise system 102 sends a request with the data structure 114, then the transaction manager component 106 saves the data structure 114 into the data repository 110 via the API/library module $306_2$ and passes a handle to the transaction gateway component 104. The transaction gateway component 104 may then load the data structure 114 into memory via the API/library module $306_1$ and by using the handle. At least in some embodiments, the data structure 114 is, in part or in whole, loaded into an area of memory other than control region memory and that is hence not subject to the size constraint. Further, at least in some embodiments, the distributed server 501 may directly access the API/library module $306_3$ to load, store, send, or receive arbitrarily large data structures to or from the transaction gateway component 104, as represented by the request $502_3$. The transaction gateway component 104 then sends the request and the loaded data structure 114 to the distributed server 501. Doing so allows transactions to be processed, even when the transactions involve data structures that exceed the size constraint of control region memory, thereby effectively eliminating the size constraint for data structures. Accordingly, the flexibility of transaction processing may be improved at least in some cases.

Figure 6:
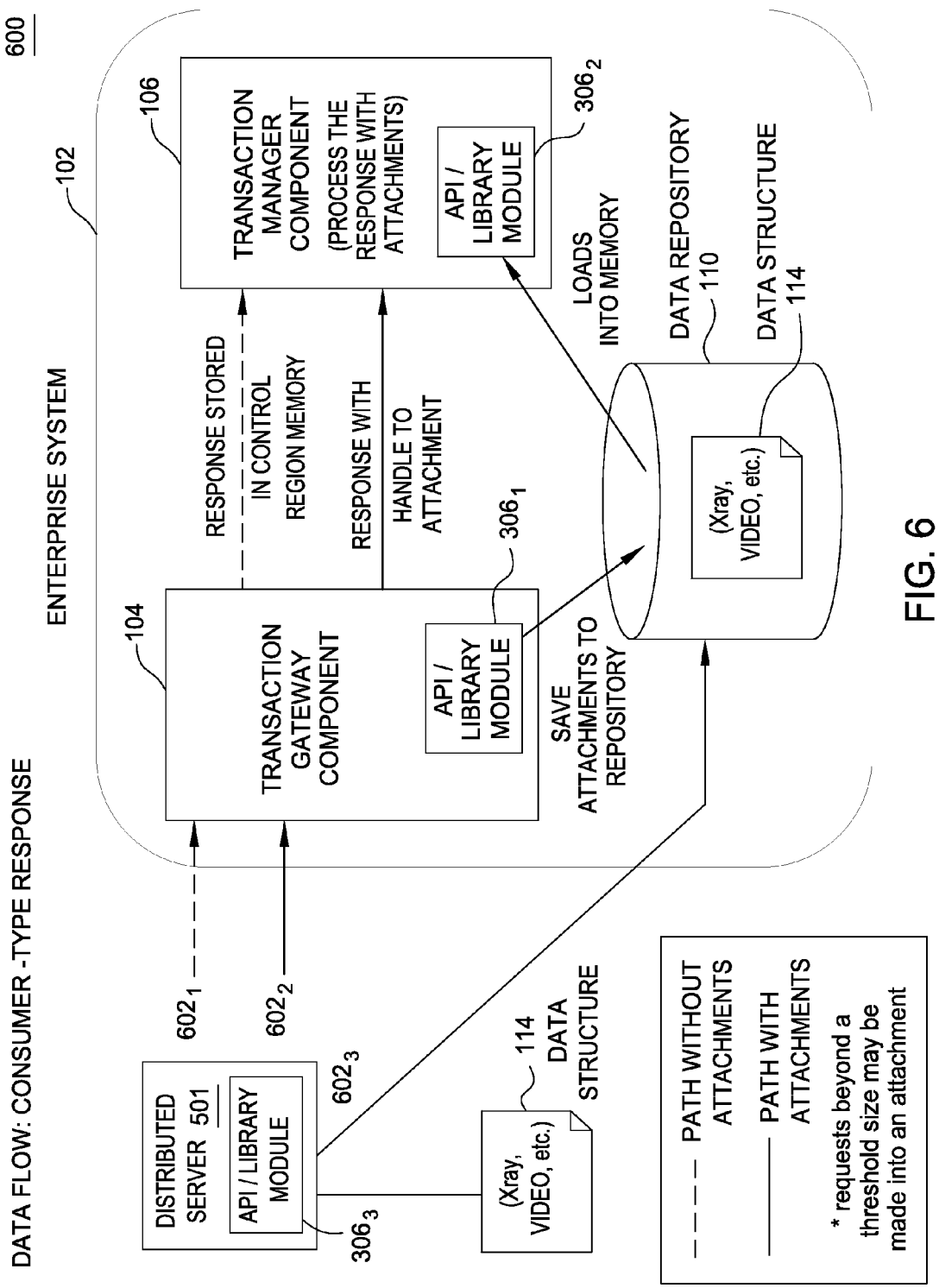
FIG. 6 is a data flow diagram of transaction processing for a consumer-type response, according to one embodiment presented in this disclosure.

FIG. 6 is a data flow diagram 600 of transaction processing for a consumer-type response, according to one embodiment presented in this disclosure. In one embodiment, when the distributed server 501 sends, to the enterprise system 102, a response $602_1$ without data structures, the response $602_1$ is first received by the transaction gateway component $602_1$ is first received by the transaction gateway component 104, where the request $602_1$ is stored in control region memory. The transaction gateway component 104 then sends the request $602_1$ to the transaction manager component 106.

On the other hand, when the distributed server 501 responds to the enterprise system 102 with the data structure 114, the data structure 114 is, in part or in whole, loaded into an area of memory other than control region memory and that is hence not subject to the size constraint. The transaction gateway component 104 then saves the data structure 114 into the data repository 110 via the API/library module $306_1$. The transaction gateway component 104 then sends a handle obtained from the data repository 110 and pertaining to the stored data structure 114, to the transaction manager component 106. The transaction manager component 106 may then load the data structure 114 into memory via the API/library module $306_2$ and by using the handle. Further, at least in some embodiments, the distributed server 501 may directly access the API/library module $306_3$ to load, store, send, or receive arbitrarily large data structures to or from the transaction gateway component 104, as represented by the response $602_3$.

In some embodiments, the transaction manager component 106 does not have any control region memory—or any memory subject to the size constraint. In alternative embodiments, the transaction manager component 106 has an associated control region memory separate from the control region memory of the transaction gateway component 104. In such alternative embodiments, the data structure 114 is, in part or in whole, loaded into an area of memory of the transaction manager component 106, other than control region memory. Accordingly, transactions may be processed even when the transactions involve data structures that exceed the size constraint of the control region memory, thereby effectively eliminating the size constraint for data structures. Consequently, the flexibility of transaction processing may be improved at least in some cases.

Figure 7:
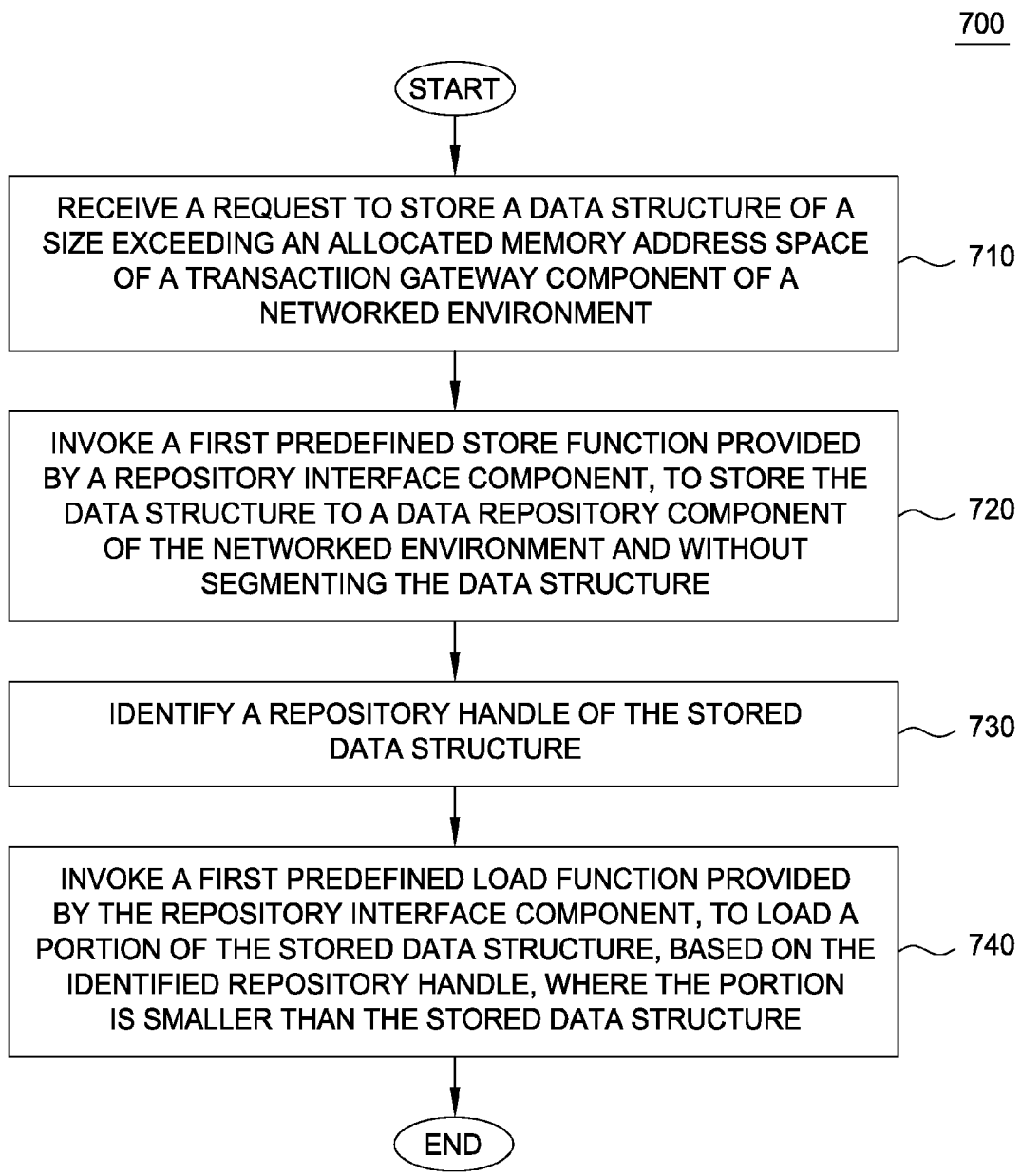
FIG. 7 is a flowchart depicting a method to manage arbitrarily large data units for transaction processing in the networked environment, according to one embodiment presented in this disclosure.

FIG. 7 is a flowchart depicting a method 700 to manage arbitrarily large data structures for transaction processing in a networked environment communicably connected to an external application, according to one embodiment presented in this disclosure. The method 700 and methods below are, without limitation and for illustrative purposes only, described in conjunction with the networked environment being the enterprise system 102 of FIG. 1, and further in conjunction with the external application being a distributed application. As shown, the method 700 begins at step 710, where the enterprise system 102 receives, from the distributed application, a request to store a data structure of a size exceeding an allocated memory address space of a transaction gateway component. At step 720, the enterprise system 102 invokes a first predefined store function provided by a repository interface component, to store the data structure to a data repository component, without segmenting the data structure. At step 730, the enterprise system 102 identifies a repository handle of the stored data structure. At step 740, the enterprise system 102 invokes a first predefined load function provided by the repository interface component, to load a portion of the stored data structure, based on the identified repository handle, where the portion is smaller than the stored data structure. After the step 740, the method 700 terminates.

Accordingly, a total amount of the data structure, that is transmitted between non-repository components in the networked environment, is reduced—at least relative to transmitting the first data unit between non-repository components in the networked environment without using the data repository component, where the non-repository components include the transaction gateway component and the transaction manager component of the networked environment. Stated differently, the total amount of the first data unit, that is transmitted between the transaction gateway component and the transaction manager component may be reduced, at least relative to transmitting the first data unit between the transaction gateway component and the transaction manager component without using the data repository component. Accordingly, invoking the first predefined load function based on the identified repository handle may cause the repository interface component to load the portion of the stored data unit to a transaction manager component of the networked environment. Doing so provides the transaction manager component with the portion of the first data unit without requiring the portion of the first data unit to be transmitted from the transaction gateway component to the transaction manager component. Consequently, the amount of network traffic—or impact on other network traffic— associated with transmitting the data structure between the transaction gateway component and the transaction manager component may be reduced or eliminated, if the transaction gateway component or the external application stores the data structure into the data repository component for subsequent retrieval by the transaction gateway component. The impact on other network traffic within the networked environment may be reduced especially in scenarios and networked environments where more bandwidth is available for storing and loading the data structure to and from the repository component than for transmitting the data structure between the transaction gateway component and the transaction manager component. Further, by loading only a portion of the data structure when only the portion is desired to be retrieved, the amount of network traffic—or impact on other network traffic—associated with transmitting the data structure within the networked environment may be further reduced at least in some cases, because the remaining portion of the data structure, that is not desired to be retrieved, need not be retrieved or transmitted in the networked environment.

Figure 8:
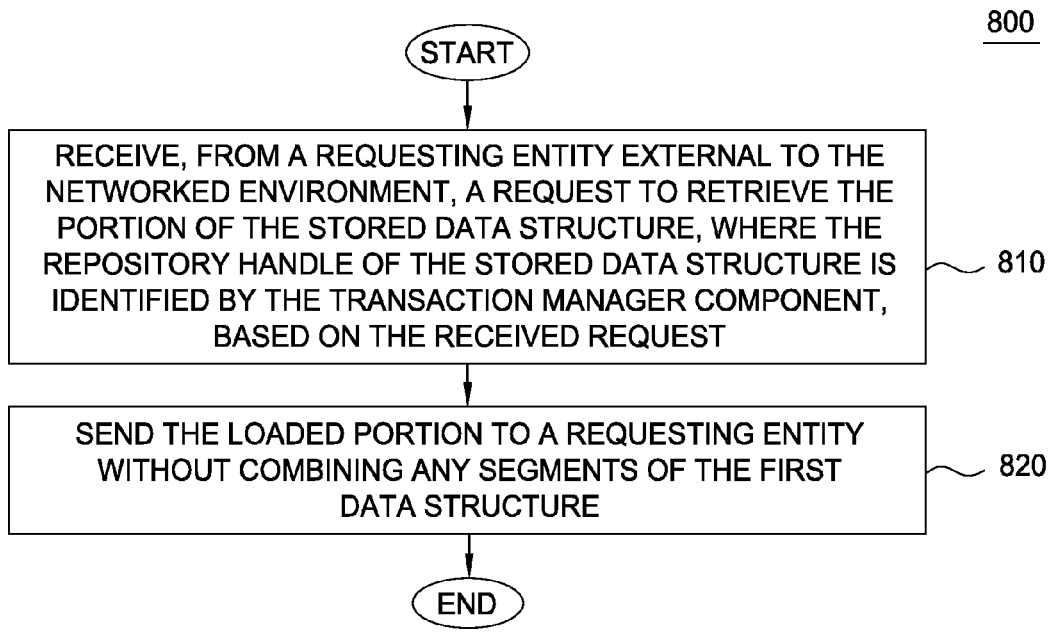
FIG. 8 is a flowchart depicting a method to retrieve portions of arbitrarily large data units for transaction processing in the networked environment, according to one embodiment presented in this disclosure.

FIG. 8 is a flowchart depicting a method 800 to retrieve portions of arbitrarily large data structures for transaction processing in the networked environment, according to one embodiment presented in this disclosure. As shown, the method 800 begins at step 810, where the enterprise system 102 receives, from the distributed application, a request to retrieve the portion of the stored data structure. At least in some embodiments, the repository handle of the stored data structure is identified by the transaction manager component, based on the received request. At step 820, the enterprise system 102 sends the loaded portion to the distributed application, without assembling any segments of the first data structure. After the step 820, the method 800 terminates.

Figure 9:
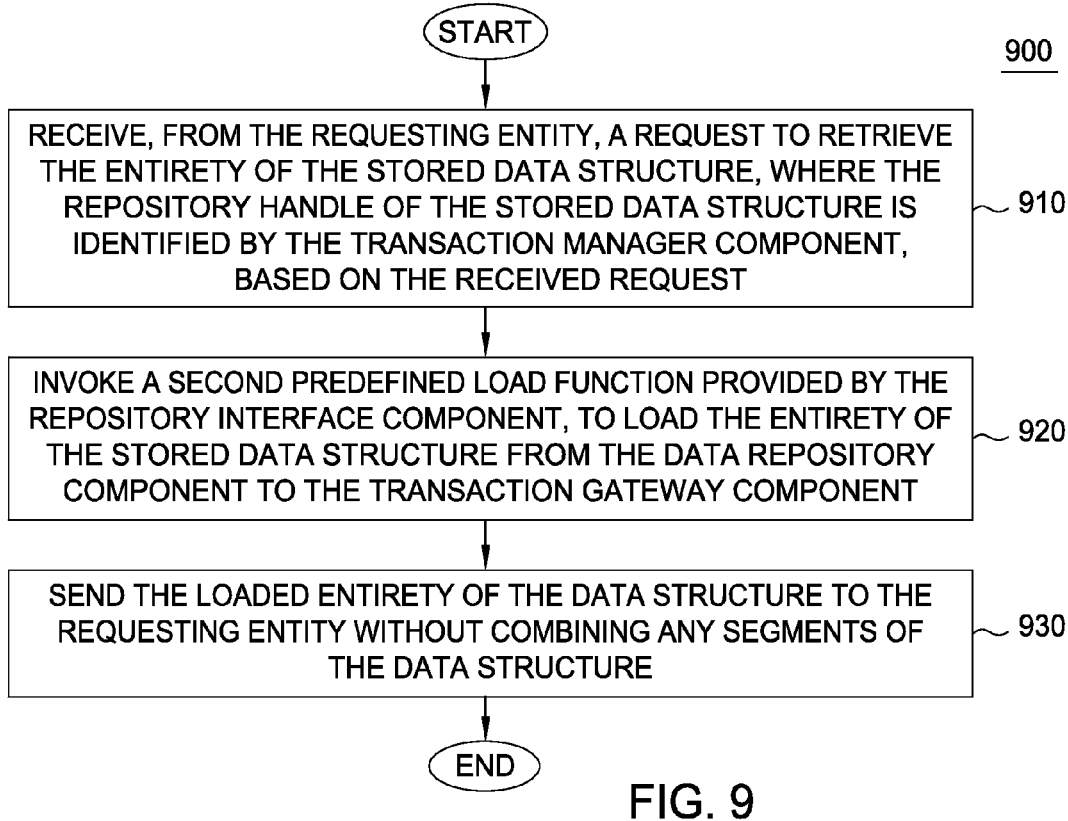
FIG. 9 is a flowchart depicting a method to load entireties of arbitrarily large data units for transaction processing in the networked environment, according to one embodiment presented in this disclosure.

FIG. 9 is a flowchart depicting a method 900 to load entireties of arbitrarily large data structures for transaction processing in the networked environment, according to one embodiment presented in this disclosure. As shown, the method 900 begins at step 910, where the enterprise system 102 receives, from the distributed application, a request to retrieve the entirety of the stored data structure. At least in some embodiments, the repository handle of the stored data structure is identified by the transaction manager component, based on the received request. At step 920, the enterprise system 102 invokes a second predefined load function provided by the repository interface component, to load the entirety of the stored data structure from the data repository component to the transaction gateway component. At step 930, the enterprise system 102 sends the loaded entirety of the data structure to the distributed application without combining any segments of the data structure. After the step 930, the method 900 terminates.

Embodiments disclosed herein provide techniques to manage arbitrarily large data structures for transaction processing in a networked environment. By configuring components of the networked environment to communicate with a repository interface component that provides predefined load and store functions based on repository handles, instances of data structures being forwarded without the networked environment may be reduced, thus improving transaction processing efficiency and flexibility at least in some cases.

Figure 10:
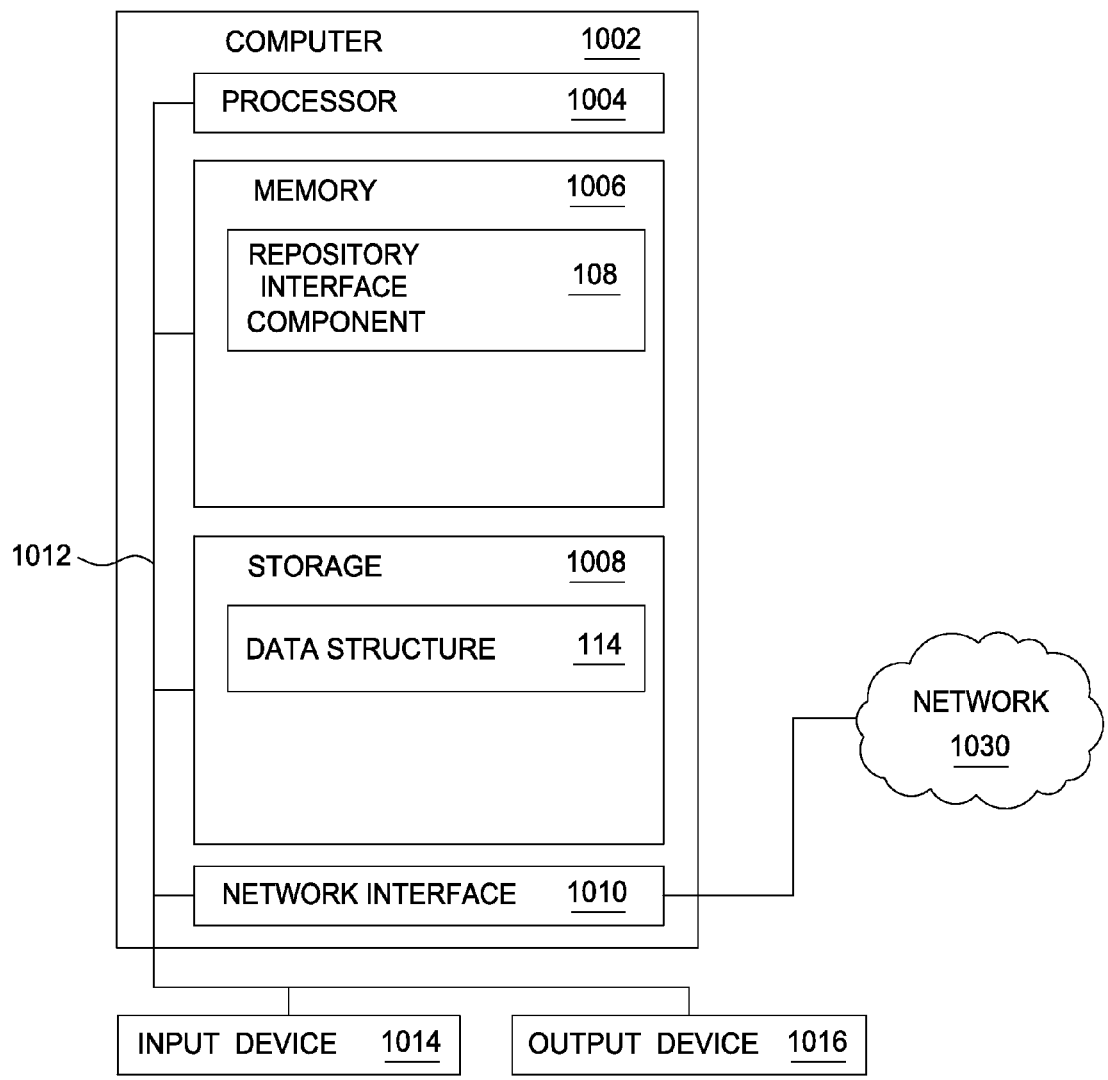
FIG. 10 is a block diagram illustrating a component of the networked system that is configured to process transactions involving arbitrarily large data units, according to one embodiment presented in this disclosure.

FIG. 10 is a block diagram illustrating components of a networked system 1000 configured to process transactions involving arbitrarily large data structures, according to one embodiment presented in this disclosure. The networked system 1000 includes a computer 1002. The computer 1002 may also be connected to other computers via a network 1030. In general, the network 1030 may be a telecommunications network and/or a wide area network (WAN). In a particular embodiment, the network 1030 is the Internet.

The computer 1002 generally includes a processor 1004 connected via a bus 1012 to a memory 1006, a network interface device 1010, a storage 1008, an input device 1014, and an output device 1016. The computer 1002 is generally under the control of an operating system. Examples of operating systems include IBM z/OS®, UNIX, versions of the Microsoft Windows® operating system, and distributions of the Linux® operating system. More generally, any operating system supporting the functions disclosed herein may be used. The processor 1004 is included to be representative of a single CPU, multiple CPUs, a single CPU having multiple processing cores, and the like. Similarly, the memory 1006 may be a random access memory. While the memory 1006 is shown as a single identity, it should be understood that the memory 1006 may comprise a plurality of modules, and that the memory 1006 may exist at multiple levels, from high speed registers and caches to lower speed but larger DRAM chips. The network interface device 1010 may be any type of network communications device allowing the computer 1002 to communicate with other computers via the network 1030.

The storage 1008 may be a persistent storage device. Although the storage 1008 is shown as a single unit, the storage 1008 may be a combination of fixed and/or removable storage devices, such as fixed disc drives, solid state drives, floppy disc drives, tape drives, removable memory cards or optical storage. The memory 1006 and the storage 1008 may be part of one virtual address space spanning multiple primary and secondary storage devices.

The input device 1014 may be any device for providing input to the computer 1002. For example, a keyboard, a mouse, a touchpad, voice commands, or any combination thereof may be used. The output device 1016 may be any device for providing output to a user of the computer 1002. For example, the output device 1016 may be any display screen or set of speakers. Although shown separately from the input device 1014, the output device 1016 and input device 1014 may be combined. For example, a display screen with an integrated touch-screen may be used.

As shown, the memory 1006 of the computer 1002 includes the repository interface component 108 of the enterprise system 102 of FIG. 1. The storage 1008 includes the data structure 114, which may be arbitrarily large in size. As described above, in one embodiment, the repository interface component 108 provides an API to load or store the data structure 114. Further, depending on the embodiment, one or more other components of the enterprise system described herein, such as the transaction gateway component 104, the transaction manager component 106, the data repository 102, and the message queue 304 may execute on the computer 1002 or on one or more computers communicably connected to the computer 1002 via the network 1030.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the computer of a user, partly on the computer of the user, as a stand-alone software package, partly on the computer of the user and partly on a remote computer, or entirely on the remote computer or server. In the latter scenario, the remote computer may be connected to the computer of the user via any type of network, including a local area network (LAN) or a wide area network (WAN), or the connection may be made to an external computer (for example, through the Internet using an Internet Service Provider).

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., enterprise system 102) or related data available in the cloud. For example, the enterprise system 102 could execute on one or more computing systems in the cloud and process transactions involving arbitrarily large data structures.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration can be implemented by special-purpose hardware-based systems that perform the specified functions or acts, or combinations of special purpose hardware and computer instructions.

While the foregoing is directed to embodiments presented in this disclosure, other and further embodiments may be devised without departing from the basic scope of contemplated embodiments, and the scope thereof is determined by the claims that follow.

What is claimed is:

1. A computer program product to manage arbitrarily large transactional data structures for transaction processing, by an enterprise information system having a transaction gateway component, a transaction manager component, and a repository interface component, the computer program product comprising:
    a non-transitory computer-readable medium having program code embodied therewith, the program code executable by one or more computer processors to:
        receive, the transaction gateway component of the enterprise information system, a first request to store a first transactional data structure of a size exceeding an allocated memory address space of the transaction gateway component;
        invoke, by the transaction gateway component, a first predefined store function provided by the repository interface component of the enterprise information system, in order to store the first transactional data structure to a data repository component of the enterprise information system and without segmenting the first transactional data structure;
        identify, by the repository interface component, a repository handle of the stored transactional data structure, wherein the repository handle is passed from the transaction gateway component to the transaction manager component of the enterprise information system; and
        invoke, by the transaction manager component and based on the repository handle, a first predefined load function provided by the repository interface component, in order to load, to the transaction manager component, only a portion of the stored transactional data structure, wherein the portion is smaller than the stored transactional data structure.

2. The computer program product of claim 1, wherein the transaction manager component is provided with the portion of the first transactional data structure without requiring the portion of the first data unit to be transmitted from the transaction gateway component to the transaction manager component.

3. The computer program product of claim 2, wherein the program code is further executable to:
    receive, from a requesting entity external to the networked environment, a second request to retrieve the portion of the stored transactional data structure, wherein the repository handle of the stored transactional data structure is identified by the transaction manager component, based on the second request; and
    send the loaded portion to the requesting entity, responsive to the second request and without combining any segments of the first transactional data structure.

4. The computer program product of claim 3, wherein the program code is further executable to receive, from the requesting entity, a third request to retrieve the entirety of the stored transactional data structure, wherein the repository handle of the stored transactional data structure is identified by the transaction manager component, based on the third request;
    invoke a second predefined load function provided by the repository interface component in order to load the entirety of the stored transactional data structure from the data repository component to the transaction gateway component, wherein the first predefined load function and the second predefined load function are distinct functions; and
    send the loaded entirety of the first transactional data structure unit to the requesting entity, responsive to the third request and without combining any segments of the first transactional data structure.

5. The computer pro rare product of claim 4, wherein the repository interface component further provides:
    a second predefined store function configured to append data to the stored transactional data structure, wherein the first predefined store function and the second predefined, store function are distinct functions; and
    a predefined delete function configured to remove the first transactional data structure from the data repository component.

6. The computer program product of claim 5, wherein the first predefined store function specifies a first set of formal parameters consisting of a pointer to a desired transactional data structure, a size of the desired transactional data structure, and a property set of the desired transactional data structure;
    wherein the second predefined store function specifies a second set of formal parameters consisting of a pointer to a desired transactional data structure, a size of the desired transactional data structure, a repository handle of the desired transactional data structure, and a property set of the desired transactional data structure;

wherein the first predefined load function specifies a third set of formal parameters consisting of a repository handle of the desired transactional data structure, an offset into the desired transactional data structure, a size of the desired transactional data structure, and a property set of the desired transactional data structure;

wherein the second predefined load function specifies a fourth set of formal parameters consisting of: (i) a repository handle of the desired transactional data structure and (ii) a property set of the desired transactional data structure;

wherein the predefined delete function specifies a fifth set of formal parameters consisting of: (i) a repository handle of the desired transactional data structure and (ii) a property set of the desired transactional data structure;

wherein each property set includes repository access information, a browse option, a discard option, and a retrieval option.

7. The computer program product of claim 6,
wherein the first request is received from the requesting entity, wherein the transaction gateway component comprises an enterprise gateway component, wherein the allocated memory address space comprises control region memory of the transaction gateway component;

wherein each request is selected from a provider-type request and a consumer type request, wherein each request is not a web service request, wherein the first request, the second request, and the third request are distinct requests, wherein the requesting entity comprises a distributed client application;

wherein storing the first transactional data structure to the data repository component without segmenting the first transactional data structure comprises storing the first transactional data structure to the data repository component while bypassing a message queue component of the enterprise information system, wherein the message queue component is configured to segment transactional data structures;

wherein the loaded portion, which is sent to the requesting entity without combining any segments of the first transactional data structure, is retrieved by bypassing the message queue component of the enterprise information system, wherein the message queue component is further configured to combine transactional data structure segments.

8. The computer program product of claim 1, wherein the repository interface component further provides a second predefined store function configured to append data to the stored transactional data structure.

9. The computer program product of claim 1, wherein the repository interface component further provides a predefined delete function configured to remove the first transactional data structure from the data repository component.

10. The computer program product of claim 1, wherein the first transactional data structure is stored to the data repository component while bypassing a message queue component of the enterprise information system.

11. The computer program product of claim 1, wherein the portion of the first transactional data structure is loaded while bypassing a message queue component of the enterprise information system.

12. A system to manage arbitrarily large transactional data structures for transaction processing, by an enter rise information s stem having a transaction gateway component, a transaction manager component, and a repository interface component, the system comprising:

one or more computer processors;
a memory containing a program which, when executed by the one or more computer processors, is configured to perform an operation comprising:
receiving, by the transaction gateway component of the enterprise information system, a first request to store a first transactional data structure of a size exceeding an allocated memory address space of the transaction gateway component;
invoking, by the transaction gateway component, a first predefined store function provided by the repository interface component of the enterprise information s stem, in order to store the first transactional data structure to a data repository component of the enterprise information, system and without segmenting the first transactional data structure;
identifying, by the repository interface component, a repository handle of the stored transactional data structure, wherein the repository handle is passed from the transaction gateway component to the transaction Tanager component of the enterprise information system; and
invoking, by the transaction manager component and based on the repository handle, a first predefined load function provided by the repository interface component, in order to load, to the transaction manager component, only a portion of the stored transactional data structure, wherein the portion is smaller than the stored transactional data structure.

13. The system of claim 12, wherein the transaction manager component is provided with the portion of the first transactional data structure without requiring the portion of the first transactional data structure to be transmitted from the transaction gateway component to the transaction manager component.

14. The system of claim 13, wherein the operation further comprises:
receiving, from a requesting entity external to the networked environment, a second request to retrieve the portion of the stored transactional data structure, wherein the repository handle of the stored transactional data structure is identified by the transaction manager component, based on the second request; and
sending the loaded portion to the requesting entity, responsive to the second request and without combining any segments of the first transactional data structure.

15. The system of claim 14, wherein the operation further comprises:
receiving, from the requesting entity, a third request to retrieve the entirety of the stored transactional data structure, wherein the repository handle of the stored transactional data structure is identified by the transaction manager component, based on the third request;
invoking a second predefined load function provided by the repository interface component in order to load the entirety of the stored transactional data structure from the data repository component to the transaction gateway component, wherein the first predefined load function and the second predefined load function are distinct functions; and,
sending the loaded entirety of the first transactional data structure unit to the requesting entity responsive to the third request and without combining any segments of the first transactional data structure.

16. The system of claim 15, wherein the repository interface component further provides:

a second predefined store function configured to append data to the stored transactional data structure, wherein the first predefined store function and the second predefined store function are distinct functions; and a predefined delete function configured to remove the first transactional data structure from the data repository component.

17. The system of claim 12, wherein the repository interface component further provides a second predefined store function configured to append data to the stored transactional data structure.

18. The system of claim 12, wherein the repository interface component further provides a predefined delete function configured to remove the first transactional data structure from the data repository component.

19. The system of claim 12, wherein the first transactional data structure is stored to the data repository component while bypassing a message queue component of the enterprise information system.

20. The system of claim 12, wherein the portion of the first transactional data structure is loaded while bypassing a message queue component of the enterprise information system.

\* \* \* \* \*